US008345971B2

(12) United States Patent
Zhang et al.

(10) Patent No.: US 8,345,971 B2
(45) Date of Patent: Jan. 1, 2013

(54) METHOD AND SYSTEM FOR SPATIAL-TEMPORAL DENOISING AND DEMOSAICKING FOR NOISY COLOR FILTER ARRAY VIDEOS

(75) Inventors: Lei Zhang, Kowloon (HK); Weisheng Dong, Kowloon (HK); Hainlong Zhu, Kowloon (HK)

(73) Assignee: The Hong Kong Polytechnic University, Kowloon (HK)

( * ) Notice: Subject to any disclaimer, the term of this patent is extended or adjusted under 35 U.S.C. 154(b) by 226 days.

(21) Appl. No.: 12/825,126

(22) Filed: Jun. 28, 2010

(65) Prior Publication Data

US 2011/0317916 A1  Dec. 29, 2011

(51) Int. Cl.
*G06K 9/00* (2006.01)
(52) U.S. Cl. ..................................... 382/167
(58) Field of Classification Search .............. None
See application file for complete search history.

(56) References Cited

U.S. PATENT DOCUMENTS

| | | | |
|---|---|---|---|
| 3,971,065 A | 7/1976 | Bayer | |
| 5,506,619 A | 4/1996 | Adams, Jr. et al. | |
| 6,229,578 B1* | 5/2001 | Acharya et al. | 348/607 |
| 7,034,892 B2* | 4/2006 | Ojo et al. | 348/607 |
| 7,548,659 B2* | 6/2009 | Ofek et al. | 382/254 |
| 2003/0048368 A1* | 3/2003 | Bosco et al. | 348/272 |
| 2004/0119861 A1* | 6/2004 | Bosco et al. | 348/272 |
| 2006/0038891 A1* | 2/2006 | Okutomi et al. | 348/222.1 |
| 2006/0257042 A1* | 11/2006 | Ofek et al. | 382/255 |
| 2010/0026839 A1* | 2/2010 | Border et al. | 348/231.2 |
| 2010/0165122 A1* | 7/2010 | Castorina et al. | 348/208.4 |

OTHER PUBLICATIONS

U.S. Appl. No. 11/426,128, filed Jun. 23, 2006, now abandoned, 31 pgs.
Aharon et al., "K-SVD: An Algorithm for Designing Overcomplete Dictionaries for Sparse Representation", IEEE Transactions on Signal Processing, Nov. 2006, vol. 54, No. 11, pp. 4311-4322.
Buades et al., "A Review of Image Denoising Algorithms, With a New One", Multiscale Model. Simul., 2005, vol. 4, No. 2, pp. 490-530.
Dabov et al., "Image restoration by sparse 3D transform-domain collaborative filtering", Proc. SPIE Electronic Imaging, 2008, vol. 68, No. 6812-1D, 12 pgs.
Dabov et al., "Video Denoising by Sparse 3D Transform-Domain Collaborative Filtering", 15th European Signal Processing Conference (EUSIPCO 2007), Sep. 3-7, 2007, pp. 145-149.
Donoho et al., "Ideal Spatial Adaptation by Wavelet Shrinkage", Biometrika, 1994, vol. 81, pp. 425-455.
Foi et al., "Noise measurement for raw-data of digital imaging sensors by automatic segmentation of non-uniform targets", IEEE Sensors Journal, date unknown, pp. 1-6.
Gunturk et al., "Demosaicking: Color Filter Array Interpolation", IEEE Signal Processing Magazine, Jan. 2005, pp. 44-54.

(Continued)

*Primary Examiner* — Samir Ahmed
(74) *Attorney, Agent, or Firm* — Kauth, Pomeroy, Peck & Bailey LLP

(57) ABSTRACT

A method for spatial-temporal denoising and demosaicking for noisy color filter array (CFA) video, the method including applying spatial-temporal CFA video denoising (11) to the CFA video in order to generate a denoised CFA, applying initial color demosaicking (CDM) (19) to the denoised CFA video in order to generate a demosaicked video, and applying spatial-temporal post-processing (26) to the demosaicked video in order to reduce CDM artifacts and CDM errors and enhance the quality of the video.

7 Claims, 8 Drawing Sheets

OTHER PUBLICATIONS

Hirakawa et al., "A Framework for Wavelet-Based Analysis and Processing of Color Filter Array Images with Applications to Denoising and Demosaicing", ICASSP, 2007, pp. I-597-I-603.

Hirakawa et al., "Adaptive Homogeneity-Directed Demosaicing Algorithm", IEEE, 2003, pp. III-669-III-672.

Hirakawa et al., "Joint Demosaicing and Denoising", IEEE Transactions on Image Processing, Aug. 2006, vol. 15, No. 8, pp. 2146-2157.

Koh et al., "New Efficient Methods of Image Compression in Digital Cameras with Color Filter Array", IEEE Transactions on Consumer Electronics, Nov. 2003, vol. 49, No. 4, pp. 1448-1456.

Li, "Demosaicing by Successive Approximation", IEEE Transactions on Image Processing, Mar. 2005, vol. 14, No. 3, pp. 370-379.

Li et al., "Image Demosaicing: A Systematic Survey", Visual Communications and Image Processing 2008, Proceedings of the SPIE, 2008, vol. 6822, 15 pgs.

Lukac et al., "Vector Filtering for Color Imaging", IEEE Signal Processing Magazine, Jan. 2005, pp. 74-86.

Muresan et al., "Adaptive Principal Components and Image Denoising", IEEE, 2003, pp. I-101-I-104.

Paliy et al., "Demosaicing of Noisy Data: Spatially Adaptive Approach", SPIE-IS&T Electronic Imaging, 2007, vol. 6497, pp. 64970K-1-64970K-12.

Paliy et al., "Spatially Adaptive Color Filter Array Interpolation for Noiseless and Noisy Data", Journal of Imaging Systems and Technology, Special Issue on Applied Color Image Processing, 2007, vol. 17, pp. 105-122.

Pizurica et al., "Estimating the Probability of the Presence of a Signal of Interest in Multiresolution Single- and Multiband Image Denoising", IEEE Transactions on Image Processing, Mar. 2006, vol. 15, No. 3, pp. 654-665.

Portilla et al., "Image Denoising Using Scale Mixtures of Gaussians in the Wavelet Domain", IEEE Transactions on Image Processing, Nov. 2003, vol. 12, No. 11, pp. 1338-1351.

Wu et al., "Improvement of Color Video Demosaicking in Temporal Domain", IEEE Transactions on Image Processing, Oct. 2006, vol. 15, No. 10, pp. 3138-3151.

Wu et al., "Temporal Color Video Demosaicing via Motion Estimation and Data Fusion", IEEE Transactions on Circuits and Systems for Video Technology, Feb. 2006, vol. 16, No. 2, pp. 231-240.

Zhang, "Color Demosaicking Via Directional Linear Minimum Mean Square-Error Estimation", IEEE Transactions on Image Processing, Dec. 2005, vol. 14, No. 12, pp. 2167-2178.

Zhang et al., "Color Reproduction From Noisy CFA Data of Single Sensor Digital Cameras", IEEE Transactions on Image Processing, Sep. 2007, vol. 16, No. 9, pp. 2184-2197.

Zhang et al., "PCA-Based Spatially Adaptive Denoising of CFA Images for Single-Sensor Digital Cameras", IEEE Transactions on Image Processing, Apr. 2009, vol. 18, No. 4, pp. 797-812.

Zhang et al., "Two-stage image denoising by principal component analysis with local pixel grouping", Pattern Recognition, 2010, vol. 43, pp. 1531-1549.

* cited by examiner

Figure 3

|  | $G_{14}$ | $R_{10}$ | $G_{15}$ |  |
|---|---|---|---|---|
| $G_{13}$ | $B_5$ | $G_2$ | $B_6$ | $G_{16}$ |
| $R_9$ | $G_1$ | $R_0$ | $G_3$ | $R_{11}$ |
| $G_{20}$ | $B_8$ | $G_4$ | $B_7$ | $G_{17}$ |
|  | $G_{19}$ | $R_{12}$ | $G_{18}$ |  |

US 8,345,971 B2

METHOD AND SYSTEM FOR SPATIAL-TEMPORAL DENOISING AND DEMOSAICKING FOR NOISY COLOR FILTER ARRAY VIDEOS

TECHNICAL FIELD

The invention concerns a method and system for spatial-temporal denoising and demosaicking for noisy color filler array videos.

BACKGROUND OF THE INVENTION

The majority of cost-effective digital video cameras use a single sensor with a color filler array (CFA) to capture visual scenes in color. At each pixel, only one of the three primary colors is sampled and the missing color components need to be interpolated. The color interpolation process is usually referred to as color demosaicking (CDM). For video sequences, the temporal correlation in adjacent frames can also be exploited to improve the performance of CDM. The majority of CDM algorithms assume that the CFA data is noise-free. This assumption, however, is unrealistic and the presence of noise in the CFA data will cause serious CDM artifacts that are difficult to be removed by a subsequent denoising process. Many available denoising algorithms are designed for monochromatic/full-color images/videos and they are not directly applicable to the CFA data. Therefore, it is highly desirable to provide new algorithms for full-color video reconstruction from noisy CFA sequences.

A commonly used strategy is to demosaick the CFA video first and then later denoise the demosaicked video. However, the noise-caused color artifacts generated in the CDM process can be difficult to remove in the following denoising process. Some joint demosaicking and denoising approaches have been proposed. In a joint demosaicking-denoising algorithm, both demosaicking and denoising are treated as an estimation problem and solved by the total least square technique. One computationally more efficient joint demosaicking-denoising scheme first performs demosaicking-denoising on the green channel, and then uses the restored green channel to estimate the noise statistics to restore the red and blue channels. Inspired by the directional linear minimum mean square-error estimation based CDM scheme, a nonlinear and spatially adaptive filler has been proposed by using local polynomial approximation for CDM. This scheme is adapted to noisy CFA inputs for joint demosaicking-denoising.

In addition to the two abovementioned strategies, another approach to reproduce full-color images from noisy CFA data is to perform denoising before demosaicking. However, due to the mosaic structure of CFA, existing monochromatic image/video denoising methods cannot be directly applied to the CFA data. The CFA image can be divided into several monochromatic sub-images using the approaches known from the CFA image compression literature. However, such approaches do not exploit the inter-channel correlation which is useful to reduce noise. A wavelet based CFA image denoising method has been proposed. A principal component analysis (PCA) is proposed based CFA image denoising scheme. A CFA block, which contains color samples from different channels, is used to analyze the local CFA image structure. By transforming the noisy signal into the PCA domain, the signal energy can be better clustered and the noise can be more effectively removed. The PCA-based CFA image denoising algorithm effectively exploits the spatial and spectral correlation in each frame. This method was later extended to gray level images.

SUMMARY OF THE INVENTION

In a first preferred aspect, there is provided a method for spatial-temporal denoising and demosaicking for noisy color filter array (CFA) video, the method including applying spatial-temporal CFA video denoising to the CFA video in order to generate a denoised CFA, applying initial color demosaicking (CDM) to the denoised CFA video in order to generate a demosaicked video, and applying spatial-temporal post-processing to the demosaicked video in order to reduce CDM artifacts and CDM errors and enhance the quality of the video.

The spatial-temporal CFA video denoising may include partitioning each CFA frame in the CFA video to be denoised into multiple CFA blocks, stretching the CFA blocks to a variable vector, removing a noise vector from the variable vector, constructing a spatial-temporal sample dataset, and fast block matching (BM) to find similar CFA blocks to a reference CFA block in the current and adjacent CFA frames of the CFA video.

The CDM may include calculating horizontal and vertical gradients of each pixel of a CFA block, performing CDM in a horizontal or vertical direction depending on the calculated gradients, fusing filtering outputs at horizontal and vertical directions, interpolating missing green color components at red and blue positions, interpolating missing blue color components at red positions and missing red color components at blue positions, and interpolating missing red and blue color components at green positions.

The spatial-temporal post-processing may include measuring similarity between a triplet of a current pixel to be enhanced with a spatial-temporal neighborhood triplet, and calculating a weighted average of the most similar pixels to a reference pixel to determine the enhanced pixel of the reference pixel.

In a second aspect, there is provided a system for spatial-temporal denoising and demosaicking for noisy color filter array (CFA) video, the system including a spatial-temporal CFA video denoising module to apply spatial-temporal CFA video denoising to the CFA video in order to generate a denoised CFA, an initial color demosaicking (CDM) module to apply initial color demosaicking (CDM) to the denoised CFA video in order to generate a demosaicked video, and a spatial-temporal post-processing module to apply spatial-temporal post-processing to the demosaicked video in order to reduce CDM artifacts and CDM errors and enhance the quality of the video.

The system may further include a single-chip video sensor to provide the CFA video to the spatial-temporal CFA video denoising module.

The system may further include a video storage to store the full color video sequence output by the spatial-temporal post-processing module.

The spatial-temporal CFA video denoising module, the initial color demosaicking (CDM) module and the spatial-temporal post-processing module may be software modules.

Single-sensor digital video cameras use a color filler array (CFA) to capture video and a color demosaicking (CDM) procedure to reproduce the full color sequence. The reproduced video frames suffer from the inevitable sensor noise introduced in the video acquisition process. The spatial-temporal denoising and demosaicking scheme of the present invention performs without explicit motion estimation. Block based denoising is first performed on the mosaic CFA video. For each CFA block to be denoised, similar CFA blocks are selected within a local spatial-temporal neighborhood. The principal component analysis is performed on the selected CFA blocks to remove noise. Then, an initial single-frame CDM is applied to the denoised CFA data. Subsequently the demosaicked frames are post-processed by exploiting the spatial-temporal redundancy to reduce the color artifacts. The experimental results on simulated and real noisy CFA sequences demonstrate that the spatial-temporal CFA video denoising and demosaicking scheme can significantly reduce the noise-caused color artifacts and effectively preserve the image edge structures.

BRIEF DESCRIPTION OF THE DRAWINGS

An example of the invention will now be described with reference to the accompanying drawings, in which:

FIG. 3 is a schematic diagram of a CFA block centered on a red pixel;

DETAILED DESCRIPTION OF THE DRAWINGS

Figure 1:
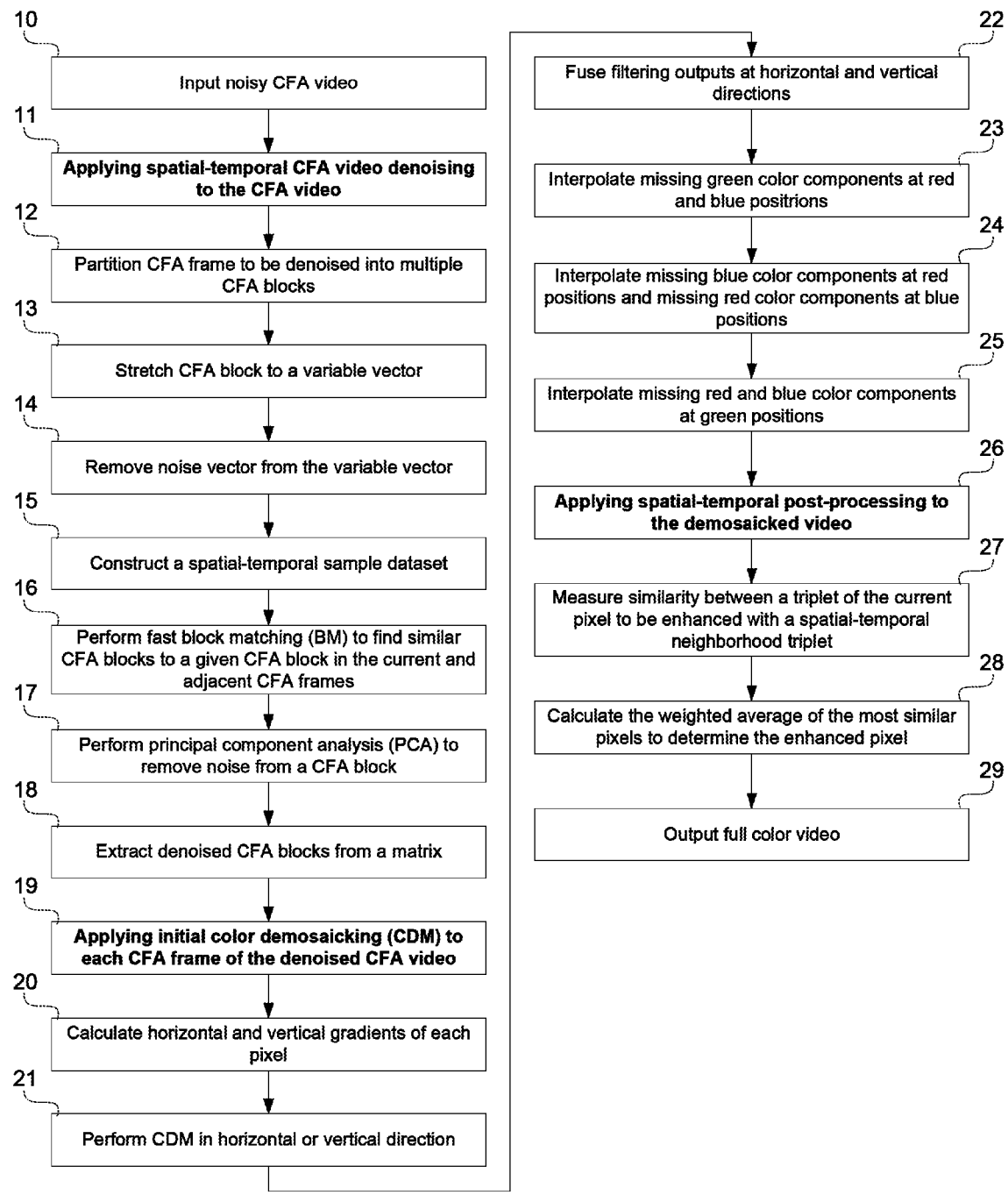
FIG. 1 is a process flow diagram of three stages of a method for spatial-temporal denoising and demosaicking for noisy CFA videos in accordance with an embodiment of the present invention.

Referring to FIG. 1, a spatial-temporal denoising and demosaicking method for noisy CFA videos is provided. The method generally has three main stages: denoise the CFA video (11); apply an initial CDM to the denoised CFA video (19); and apply spatial-temporal post-processing to the demosaicked video (26).

In the first stage, the CFA video is denoised. A Principal Component Analysis (PCA)-based CFA image denoising method is adapted to become a spatial-temporal method. The spatial-temporal method is applied to CFA videos. Since the CFA video frames are red, green and blue color interlaced mosaic images, each CFA block is considered. Each CFA block contains pixels from all the three channels, as the basic unit in the denoising. By performing CFA block matching in the current CFA frame and adjacent CFA frames, the similar CFA block to the given CFA block can be located. By viewing the elements in the CFA block as variables and viewing the pixels in the sampled matched CFA blocks, the PCA transformation matrix is computed and the denoising is then performed in the PCA domain.

A CFA video sequence is represented as a three dimensional (3D) cube. Denote by $F^c(i,j,k)$ a pixel located at spatial position (i,j) and in CFA frame k of the CFA video sequence. The superscript $c \in \{r,g,b\}$ represents the color channel of the current pixel and c depends on the spatial position (i,j). The Bayer CFA pattern is used. There is:

$$c = \begin{cases} r & i = 2 \cdot z_i + 1; \quad j = 2 \cdot z_j \\ b & i = 2 \cdot z_i; \quad j = 2 \cdot z_j + 1 \\ g & \text{other positions} \end{cases} \quad \text{Equation (2-1)}$$

where $z_i$ and $z_j$ are non-negative integers. In the Bayer pattern, the R (red), G (green) and B (blue) samples are interlaced, with the double sampling frequency of G compared to the R and B channels.

Noise is inevitably introduced in the CFA video sequence (10). This makes digital video visually unpleasing. The corrupted noise in CCD and CMOS sensors is signal-dependent. The raw sensor output is modeled as $y=x+(k_0+k_1 x)\upsilon$ where x is the desired noiseless signal, $\upsilon \in N(0,1)$ is unit Gaussian white noise and $k_o$ and $k_1$ are sensor dependent parameters. Although this noise model is quite realistic, the design of denoising algorithms is very complex and computationally expensive. One simple and widely used noise model is the additive noise model $y=x+\upsilon$. A channel-dependent noise model is used. The noisy video can be represented as:

$$F_\upsilon^c(i,j,k) = F^c(i,j,k) + \upsilon_c(i,j,k), \; c \in \{r,g,b\} \quad \text{Equation (2-2)}$$

where $\upsilon_r$, $\upsilon_g$ and $\upsilon_b$ are the noise signals in the red, green and blue channels. $\upsilon_r$, $\upsilon_g$ and $\upsilon_b$ are assumed to be zero-mean white and mutually uncorrelated in the spatial-temporal domain. The standard deviations of $\upsilon_r$, $\upsilon_g$ and $\upsilon_b$ are denoted by $\sigma_r$, $\sigma_g$ and $\sigma_b$, respectively.

If denoising is performed after CDM of the CFA sequence, the noise-caused color artifacts generated in the CDM process can be difficult to remove during denoising. Therefore denoising (11) is performed before CDM of the CFA sequence.

To fully exploit the spectral correlation in the red, green and blue channels, the CFA block in the CFA frame that contains pixels from all the three channels is taken as the basic denoising unit. The elements in the CFA block are modeled as a vector variable. Then, principal component analysis (PCA) is used to remove noise from the CFA block. This denoising strategy is used and extended to CFA videos.

Figure 2:
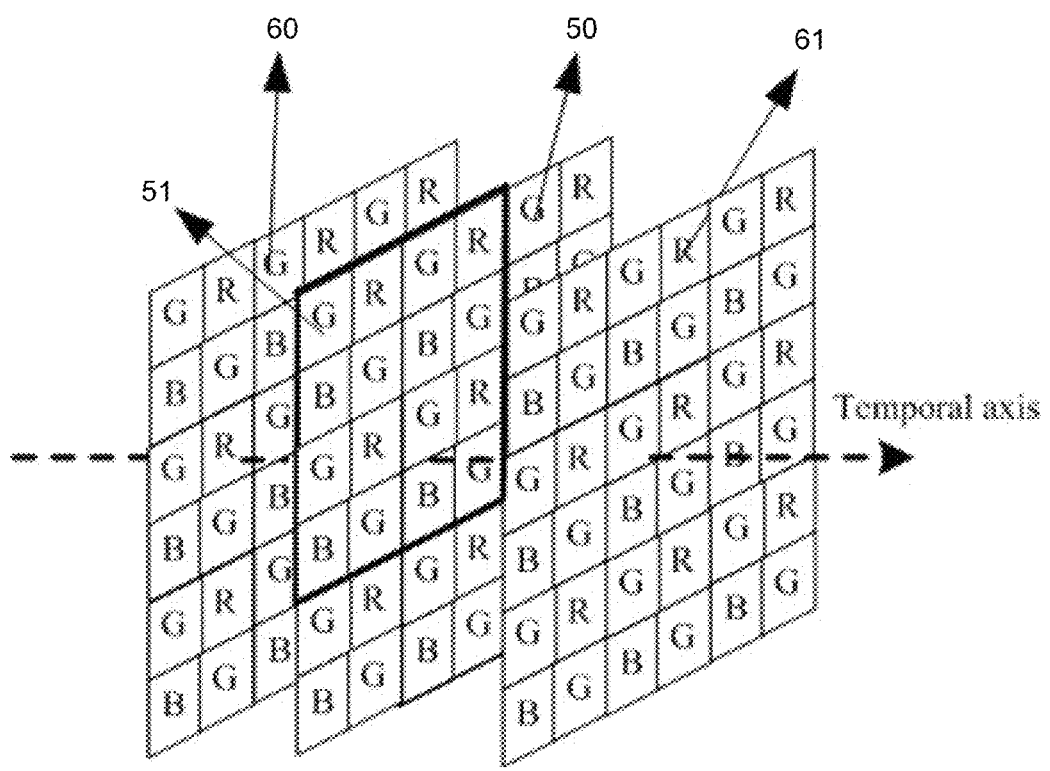
FIG. 2 is a schematic diagram of a CFA block to be denoised in a CFA frame of the CFA video.

Referring to FIG. 2, a current CFA frame 50 to be denoised is partitioned (12) into many CFA blocks 51, for example, 4×4 or 6×6 blocks. Denote by W the CFA block and suppose its size is w×w. By taking each element in the CFA block 51 as a variable, the CFA block 51 is stretched (13) to a vector variable $\vec{x}_\upsilon = [x_1^c, x_2^c, \ldots x_m^c]^T$ where $m=w^2$ Since the real data is noise corrupted, with the channel-dependent noise model in Equation (2-2), we have:

$$\vec{x}_\upsilon = [x_{1,\upsilon}^c, x_{2,\upsilon}^c, \ldots x_{m,\upsilon}^c]^T = \vec{x} + \vec{\upsilon} \quad \text{Equation (2-3)}$$

where $x_{i,\upsilon}^c = x_i^c + \upsilon_i^c$ is the noisy variable and $\vec{\upsilon} = [\upsilon_1^c, \upsilon_2^c, \ldots \upsilon_m^c]^T$ is the noise vector. Denote by $W_\upsilon$ the noisy block of W, i.e., $W_\upsilon = W+V$, where V is the noise block. The aim is to remove (14) the noise $\vec{\upsilon}$ from $\vec{x}_\upsilon$ to obtain a good estimation of $\vec{x}$, denoted by $\hat{\vec{x}}$.

In order to use PCA for denoising, a sample dataset is needed so that the covariance matrix of the vector variable $\vec{x}$ (or $\vec{x}_\upsilon$) can be estimated. Clearly, the dataset can be constructed by searching for similar CFA blocks to the given CFA block $W_\upsilon$ in its spatial-temporal neighborhood. Suppose n such blocks are found. With the condition that n>>m, the PCA-based denoising can effectively remove the noise from the noisy CFA data.

The spatial-temporal sample dataset is constructed (15). The simple and fast block matching (BM) technique is used (16) to find similar CFA blocks to the given CFA block $W_\upsilon$. Although BM is limited in terms of motion estimation (ME) accuracy, it is efficient enough for the application of denoising, and the PCA-based denoising technique is robust to small BM bias (or the ME errors) because it calculates the statistics of the matched samples and a certain amount of BM bias will not significantly affect the final denoising result. To exploit both the spatial and temporal redundancy in denoising, similar blocks to the given CFA block $W_\upsilon$ are searched in the current CFA frame and adjacent CFA frames. For a given CFA block $W_\upsilon$ and a reference block $W_{\upsilon,(\Delta i,\Delta j)}^{ref}$, where $(\Delta i,\Delta j)$ means the spatial displacement between the given CFA block $W_\upsilon$ and the reference block $W_{\upsilon,(\Delta i,\Delta j)}^{ref}$ their $L_2$ distance is calculated as $$d_{(\Delta i,\Delta j)} = \left\| W_\upsilon - W_{\upsilon,(\Delta i,\Delta j)}^{ref} \right\| \quad \text{Equation (2-4)}$$

$$= \frac{1}{w^2} \sum_{h=1}^{w} \sum_{l=1}^{w} \left( W_\upsilon(h,l) - W_{\upsilon,(\Delta i,\Delta j)}^{ref}(h,l) \right)^2$$

where $\|\bullet\|$ is the $L_2$ norm operator. Due to the mosaic CFA pattern (the Bayer pattern is used here), the displacement $(\Delta i, \Delta j)$ should satisfy the constraint $(\Delta i,\Delta j)=(2z_i,2z_j)$, where $z_i$ and $z_j$ are integers. In practice, $(\Delta i, \Delta j)$ will be in a suitable search range: $\{-Z_i \leq \Delta i \leq Z_j, -Z_j \leq \Delta j \leq Z_j\}$, where $z_i$ and $z_j$ are even integers. To robustly construct the sample dataset, the first n most similar blocks is selected (i.e., the ones who have the smallest distances $d_{(\Delta i,\Delta j)}$) to the given block $W_\upsilon$ in consecutive CFA frames and within the search range. In the following PCA-based denoising process, these n sample blocks are used to calculate the co-variance matrix of the variable vector.

In PCA-based denoising (17), by using BM, n blocks can be found including the given block and n−1 reference blocks similar to it. These n blocks are viewed as the sample blocks for the vector variable $\vec{x}_\upsilon$ (referring to Equation (2-3)). In other words, for each element of the vector variable $\vec{x}_\upsilon$, there are n samples of it. These data are formatted into an m×n matrix $$X_\upsilon = \begin{bmatrix} X_{1,1}^{c,\upsilon} & X_{1,2}^{c,\upsilon} & \cdots & X_{1,n}^{c,\upsilon} \\ X_{2,1}^{c,\upsilon} & X_{2,2}^{c,\upsilon} & \cdots & X_{2,n}^{c,\upsilon} \\ \vdots & \vdots & \vdots & \vdots \\ X_{m,1}^{c,\upsilon} & X_{m,2}^{c,\upsilon} & \cdots & X_{m,n}^{c,\upsilon} \end{bmatrix} \quad \text{(Equation 2-5)}$$

where each column of the matrix $X_\upsilon$ is the vector stretched by the sample block. The superscript "$\upsilon$" means that the samples are noise corrupted and the superscript "c" belongs to $\{r, g, b\}$, indicating the spectral channel of the sample. The first column corresponds to the sample vector to be denoised. Denote by $\hat{X}$ the denoised dataset of $X_\upsilon$, the denoised CFA block can then be extracted (18) from the first column of $\hat{X}$. The noise in the CFA video sequence has been reduced after denoising.

In the second stage, an initial CDM is applied (19) to the denoised CFA video. This results in a full-color video sequence. CDM is performed to reproduce the full color video sequence using spatial-temporal color demosaicking. An initial CDM is first applied to each CFA frame in the CFA video sequence. Then, the spatial-temporal redundancy is exploited to reduce the CDM errors.

An initial color demosaicking is performed. Second order Laplacian correction (SOLC) is a filtering algorithm for CDM. In second order Laplacian correction (SOLC), the horizontal and vertical gradients of each pixel are first calculated (20). If the horizontal gradient is less than that in the vertical direction, then CDM is performed (21) along the horizontal direction by using the SOLC filter, vice versa. Such a strategy avoids interpolating across edges. The SOLC scheme is improved by fusing (22) the filtering outputs at horizontal and vertical directions, instead of keeping only one of them.

The missing green color components are first interpolated (23). Referring to FIG. 3, considering a CFA block centered on a red pixel $R_0$, where the green color is to be estimated. The missing green colors on blue pixels can be similarly interpolated. By using the SOLC filter, the missing green color $G_0$ is interpolated along horizontal direction as $$\hat{G}_0^h = \frac{1}{2}(G_1 + G_3) + \frac{1}{4}(2 \cdot R_0 - R_9 - R_{11}).$$

Similarly, $G_0$ can be interpolated along vertical direction as $$\hat{G}_0^v = \frac{1}{2}(G_2 + G_4) + \frac{1}{4}(2 \cdot R_0 - R_{10} - R_{12}).$$

The two estimates of the horizontal direction $\hat{G}_0^h$ and vertical direction $\hat{G}_0^v$ can be fused for a more accurate estimation of $G_0$ as follows:

$$\hat{G}_0 = w_h \hat{G}_0^h + W_v \hat{G}_0^v$$

where $w_h + w_v = 1$. To determine the weights $w_h$ and $w_v$, the gradients along horizontal and vertical directions within the CFA block are first calculated as follows:

$$d_h = |G_1 - G_3| + |2 \cdot R_o - R_9 - R_{11}| + \quad \text{Equation (3-2)}$$
$$\frac{1}{2}|B_5 - B_6| + \frac{1}{2}|B_7 - B_8| +$$
$$\frac{1}{2}|2 \cdot G_2 - G_{13} - G_{16}| + \frac{1}{2}|2 \cdot G_4 - G_{17} - G_{20}|$$

$$d_v = |G_2 - G_4| + |2 \cdot R_o - R_{10} - R_{12}| + \quad \text{Equation (3-3)}$$
$$\frac{1}{2}|B_5 - B_8| + \frac{1}{2}|B_6 - B_7| +$$
$$\frac{1}{2}|2 \cdot G_1 - G_{14} - G_{19}| + \frac{1}{2}|2 \cdot G_3 - G_{15} - G_{18}|$$

Generally, a bigger gradient in one direction means more variations in that direction. Therefore, if the horizontal gradient is bigger than the vertical gradient, it should contribute less to the final estimate; vice versa. The weights are set to be $$w_h = d_v/(d_v + d_h); \quad w_v = d_h/(d_v + d_h) \quad \text{Equation (3-4)}$$

After all the missing green colors are estimated, the missing blue (red) colors can be further interpolated (24) at red (blue) positions. For example, at position $R_0$, the missing blue color can be estimated as $$\hat{B}_0 = \frac{1}{4}\sum_{i=5}^{8}(B_i - \hat{G}_i) + \hat{G}_0.$$

Finally, the missing red and blue colors at green positions can be interpolated (25). For example, the missing red color at $G_1$ can be interpolated as:

$$\hat{R}_0 = \frac{1}{4}(R_0 + R_9 + \hat{R}_5 + \hat{R}_8) - \frac{1}{4}(\hat{G}_0 + \hat{G}_9 + \hat{G}_5 + \hat{G}_8) + \hat{G}_1.$$

Then the initial CDM is completed.

After initial CDM is completed, a full color video sequence is obtained. However, there can be many CDM errors in high variation areas due to the lack of spatial redundancy. Therefore, a post-processing is necessary to reduce the CDM errors and enhance the video quality.

In the third stage, spatial-temporal post-processing is applied (26) to the demosaicked video to reduce CDM artifacts. The CDM artifacts are caused by either the limited color sampling frequency in the CFA mosaic pattern or the residual noise in the denoising stage. For a given pixel to be enhanced, the similar pixels to it are searched within the spatial-temporal neighborhood and the enhanced pixel is the weighted average of them.

Denote by $(R_0, G_0, B_0)$ the triplet of the current pixel to be enhanced. Denote by $W_0$ a local 3D window (e.g. 5×5×3) centered on $(R_0, G_0, B_0)$. For a spatial-temporal neighborhood triplet of $(R_0, G_0, B_0)$, denoted by $(R_i, G_i, B_i)$, its local 3D window is denoted by $W_i$. The similarity between $(R_0, G_0, B_0)$ and $(R_i, G_i, B_i)$ can be measured (27) by the distance between the two blocks $W_0$ and $W_i$: $d_i = \|W_0 - W_i\|$. Let $W_0^c$ and $W_i^c$, $c \in \{r, g, b\}$, be the red, green or blue channels of $W_0$ and $W_i$, we can readily have:

$$d_i = \|W_0^r - W_i^r\| + \|W_0^g - W_i^g\| + \|W_0^b - W_i^b\| = d_i^r + d_i^g + d_i^b \quad \text{Equation (3-5)}$$

where $d_i^c = \|W_0^c - W_i^c\|$, $c \in \{r, g, b\}$.

Generally, the smaller the distance $d_i$ is, the higher the similarity between $(R_0, G_0, B_0)$ and $(R_i, G_i, B_i)$ is. The first l most similar pixels to $(R_0, G_0, B_0)$, are chosen including itself, in the enhancement of it. Suppose $(R_i, G_i, B_i)$, $i=0, 1, \ldots, l-1$, are the selected most similar pixels to $(R_0, G_0, B_0)$. The enhanced pixel is the weighted average (28) of them:

$$\hat{R}_0 = \sum_{i=0}^{l-1} w_i^r R_i, \quad \text{Equation (3-6)}$$

$$\hat{G}_0 = \sum_{i=0}^{l-1} w_i^g G_i,$$

$$\hat{B}_0 = \sum_{i=0}^{l-1} w_i^b B_i$$

where the weights $w_i^r$, $w_i^g$ and $w_i^b$ are set as $$w_i^c = \frac{1}{C_c}\exp(-d_i^c/\lambda), c \in \{r, g, b\} \quad \text{Equation (3-7)}$$

$\lambda$ is a parameter to control the decay speed of weights w.r.t $d_i^c$ and constant $$C_c = \sum_{i=0}^{l-1} \exp(-d_i^c/\lambda)$$

is to normalize the weights. Clearly, the higher the distance $d_i^c$ is, the lower the weight $w_i^c$ is.

Similar to the spatial-temporal denoising process, in the spatial-temporal post-processing of CDM there is an implicit motion estimation (ME) process. The ME is replaced by a similar CFA block matching process in both current CFA frame and adjacent CFA frames. It is different from the traditional ME that usually outputs a best matched reference block (per reference frame 60, 61) to the given block, the spatial-temporal CFA video denoising and demosaicking scheme find many similar blocks to the given one for noise reduction and image enhancement. Such an implicit ME effectively exploits more spatial-temporal redundancies together with the subsequent denoising and post-processing procedures. One advantage of the implicit ME is that it is robust to CFA block matching errors. Even if some of the matched blocks are inaccurately found, they would not degrade the final results that much. After spatial-temporal post-processing is completed, a full color video is output (29).

The spatial-temporal denoising and CDM method for noisy CFA videos is tested by using both simulated CFA sequences and real CFA sequences. The spatial-temporal denoising and CDM method is compared with the following state-of-the-art schemes:
 (1) The single frame joint denoising and color demosaicking (JDC) schemes.
 (2) Demosaicking first and denoising later schemes. The advanced CDM algorithms is first used to demosaick the noisy CFA video and then the KSVD and benchmark VBM3D algorithms are used to denoise the demosaicked video.
 (3) Denoising first and demosaicking later scheme. The CFA denoising scheme is first used to denoise each CFA frame and then the temporal CDM scheme is used to demosaick the video.

Among the above schemes, the proposed invention has the highest complexity. This is mainly because it involves a PCA transformation stage, which needs to calculate the covariance matrix of the dataset and apply singular value decomposition (SVD). Apart from the part of PCA transformation, the spatial-temporal denoising method has similar complexity to the VBM3D scheme.

Two simulated CFA sequences and two real CFA sequences are used in the following experiments. The parameters in the spatial-temporal denoising and CDM method are set as follows. Nine adjacent CFA frames are used in the spatial-temporal denoising and demosaicking. In the denoising stage, the size of the variable CFA block is m=6×6=36 and n=150 sample blocks are used for PCA training. In the spatial-temporal post-processing, l (refer to Equation (3-6)) is 10 and $\lambda$ is 4 (refer to Equation (3-7)). Due to the limitation of space, only partial experimental results are shown here.

Figure 4:
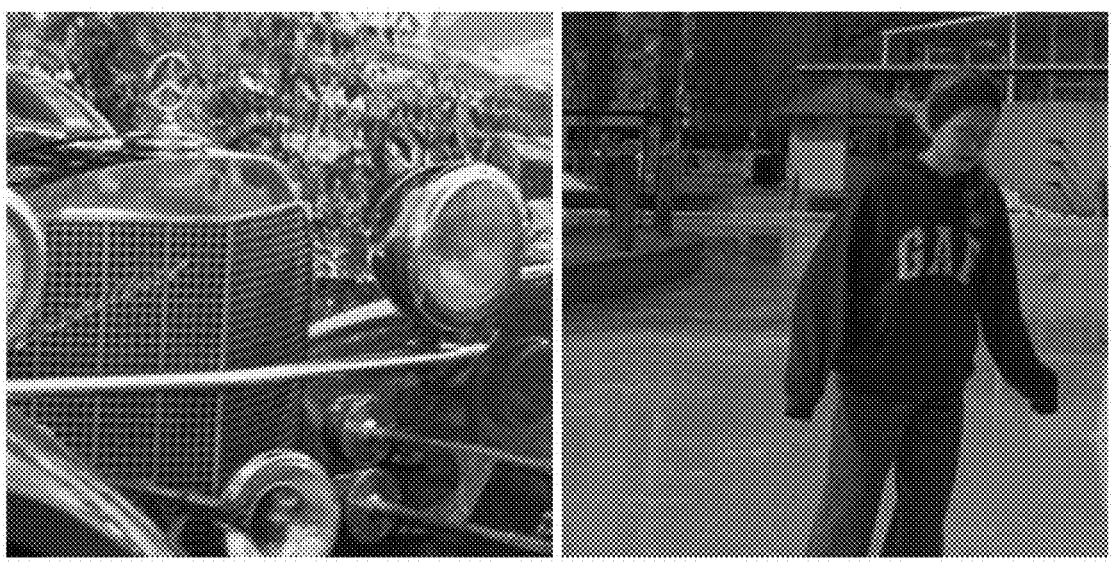
FIG. 4 is a screenshot of scenes of the two video sequences: (a) The Car sequence; and (b) the Skater sequence.

Two full color video sequences, which were first captured by a film video camera and then scanned by a scanner, are used in this experiment. These sequences were downsampled according to the Bayer pattern to simulate the CFA sequences. The original spatial resolution of the videos is 1024×768. The most difficult 256×256 portion of them are cropped and used 24 CFA frames in the experiment. FIG. 4 shows the scenes of the two cropped sequences. To simulate noisy CFA sequence, Gaussian white noise is added to each color channel For a fair comparison with other methods, two cases were considered. In the first case, the noise levels in the three channels are set to be the same: $\sigma_r = \sigma_g = \sigma_b = 15$. In the second case, the noise levels are channel-dependent, and $\sigma_r = 19$, $\sigma_g = 14$, $\sigma_b = 15$ are set for the car sequence and $\sigma_r = 18$, $\sigma_g = 19$, $\sigma_b = 14$ for the skater sequence. Since the denoising methods KSVD and VBM3D do not use a channel-dependent noise model, an equivalent noise level $$\sigma = \frac{1}{2}\sqrt{\sigma_r^2 + 2\sigma_g^2 + \sigma_b^2}$$

is applied to each channel when using them in the second case.

TABLE I

PSNR (dB) results on the Car sequence.

| Demosaicking & denoising methods | $\sigma_r = \sigma_g = \sigma_b = 15$ | | | $\sigma_r = 19, \sigma_g = 14, \sigma_b = 15$ | | |
|---|---|---|---|---|---|---|
| | R | G | B | R | G | B |
| JDC [19] | 26.6 | 26.4 | 23.7 | 26.2 | 26.4 | 23.6 |
| JDC [20] | 28.3 | 28.9 | 25.9 | 27.8 | 29.0 | 25.9 |
| [5] + KSVD [15] | 29.1 | 29.7 | 26.1 | 28.3 | 29.8 | 26.3 |
| [4] + KSVD [15] | 29.8 | 29.7 | 26.5 | 28.2 | 29.7 | 25.9 |
| [25] + [9] | 30.1 | 29.9 | 26.7 | 29.4 | 30.0 | 26.7 |
| [5] + VBM3D [17] | 29.2 | 30.8 | 27.1 | 28.8 | 31.1 | 27.2 |
| [4] + VBM3D [17] | 30.2 | 31.2 | 27.7 | 29.3 | 31.4 | 27.6 |
| Present Invention (before stage 3) | 30.5 | 30.9 | 27.4 | 30/2 | 30.9 | 27.4 |
| Present Invention (after stage 3) | 31.9 | 31.2 | 28.2 | 31.3 | 31.3 | 28.1 |

TABLE II

PSNR (dB) results on the Skater sequence.

| Demosaicking & denoising methods | $\sigma_r = \sigma_g = \sigma_b = 15$ | | | $\sigma_r = 18, \sigma_g = 19, \sigma_b = 14$ | | |
|---|---|---|---|---|---|---|
| | R | G | B | R | G | B |
| JDC [19] | 30.6 | 31.6 | 32.3 | 30.1 | 31.0 | 32.1 |
| JDC [20] | 31.5 | 32.6 | 32.7 | 30.6 | 31.3 | 32.5 |
| [5] + KSVD [15] | 31.8 | 33.6 | 33.7 | 29.9 | 31.3 | 31.7 |
| [4] + KSVD [15] | 32.6 | 33.6 | 34.1 | 31.0 | 32.0 | 33.5 |
| [25] + [9] | 32.6 | 32.9 | 33.4 | 31.7 | 31.6 | 32.8 |
| [5] + VBM3D [17] | 32.1 | 34.3 | 33.8 | 31.3 | 33.0 | 33.6 |
| [4] + VBM3D [17] | 33.1 | 34.5 | 34.5 | 32.2 | 33.2 | 34.6 |
| Present Invention (before stage 3) | 33.0 | 34.3 | 34.3 | 32.2 | 32.9 | 34.3 |
| Present Invention (after stage 3) | 34.2 | 34.6 | 35.7 | 33.3 | 33.3 | 35.4 |

Tables I and II list the average PSNR results of the reconstructed color video sequences by different schemes. The spatial-temporal denoising and CDM method achieves the best PSNR results. Particularly, the spatial-temporal denoising and CDM method reconstructs much better the R and B channels than the other schemes. This is because the sampling frequency of R and B channels is half of that of G, and hence they are more difficult to reproduce than the G channel If CDM is first applied, there will be more noise-caused CDM errors in R and B channels than in G, and even the benchmark VBM3D scheme may not denoise R and B very well By using PCA-based denoising on the CFA video, which is an adaptive and multivariate filtering technique, the spatial-temporal denoising and CDM method reduces many noise-caused CDM artifacts, and hence it can reproduce R and B much better than other schemes. It can also be found that the scheme "LMMSE_CDM+VBM3D_Denoising" (i.e., "[4]+VBM3D [17]") works the second best. This also validates that VBM3D is powerful in denoising and it can suppress many noise-caused CDM artifacts.

Figure 5:
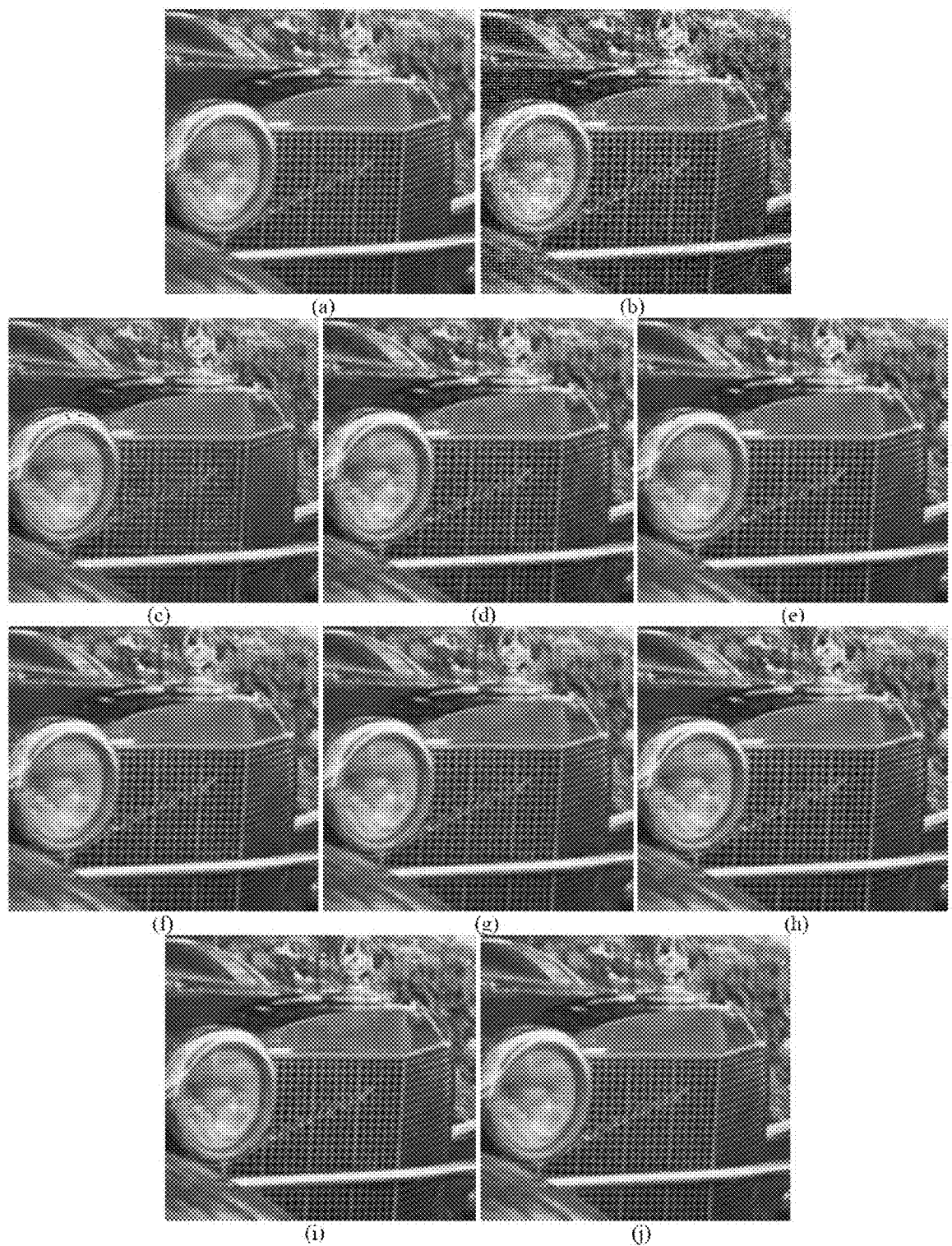
FIG. 5 is a reconstructed full color frame of the Car sequence: (a) Original full-color image; (b) noisy CFA image ($\sigma_r=\sigma_g=\sigma_b=15$); reconstructed images by methods (c) [19]; (d) [20]; (e) [5]+KSVD [15]; (f) [4]+KSVD; (g) [25]+[9]; (h) [5]+VBM3D [17]; (i) [4]+VBM3D [17]; and (j) present invention.
Figure 6:
FIG. 6 is a reconstructed full color frame of the Skater sequence. (a) Original full-color image; (b) noisy CFA image ($\sigma_r=\sigma_g=\sigma_b=15$); reconstructed images by methods (c) [19]; (d) [20]; (e) [5]+KSVD [15]; (f) [4]+KSVD; (g) [25]+[9]; (h) [5]+VBM3D [17]; (i) [4]+VBM3D [17]; and (j) present invention.

FIGS. 5 and 6 show one frame of the reproduced full color sequences by different schemes. It can be seen that the result by the spatial-temporal denoising and CDM method has the best visual perception, producing the fewest color artifacts and preserving the edge structures well The "LMMSE_CDM+VBM3D_Denoising" scheme also yields reasonably good results but shows more color artifacts, which are mostly generated in the CDM process due to the corruptive noise.

The experimental results on two real CFA sequences (Bear and Notebook) are described. The CFA sequences were captured by a single CCD video camera (model: Flea2 by Point Grey Research, Inc.) at a frame rate of 30 frames per second (fps). The original spatial size of the two CFA videos is 1280×960 and a 360×360 portion of them is cropped in the experiment. 60 frames of the Bear sequence and 45 frames of the Notebook sequence were used. The noise levels in the sequences are estimated as follows. The N×M CFA frame is divided into four N/2×M/2 sub-images (two green sub-images, one red sub-image and one blue sub-image). Then, one-stage orthogonal wavelet transform is applied to each sub-image. The noise level is estimated as $\sigma$=Median(w)/0.6475[11], where w is the diagonal sub-band at the first stage. For the green channel, the noise level is the average of the values of $\sigma$ from the two green sub-images. The estimated average noise levels for the Bear and Notebook sequences are $\sigma_r$=13, $\sigma_g$=12, $\sigma_b$=26, and $\sigma_r$=15, $\sigma_g$=12, $\sigma_b$=26, respectively.

Figure 7:
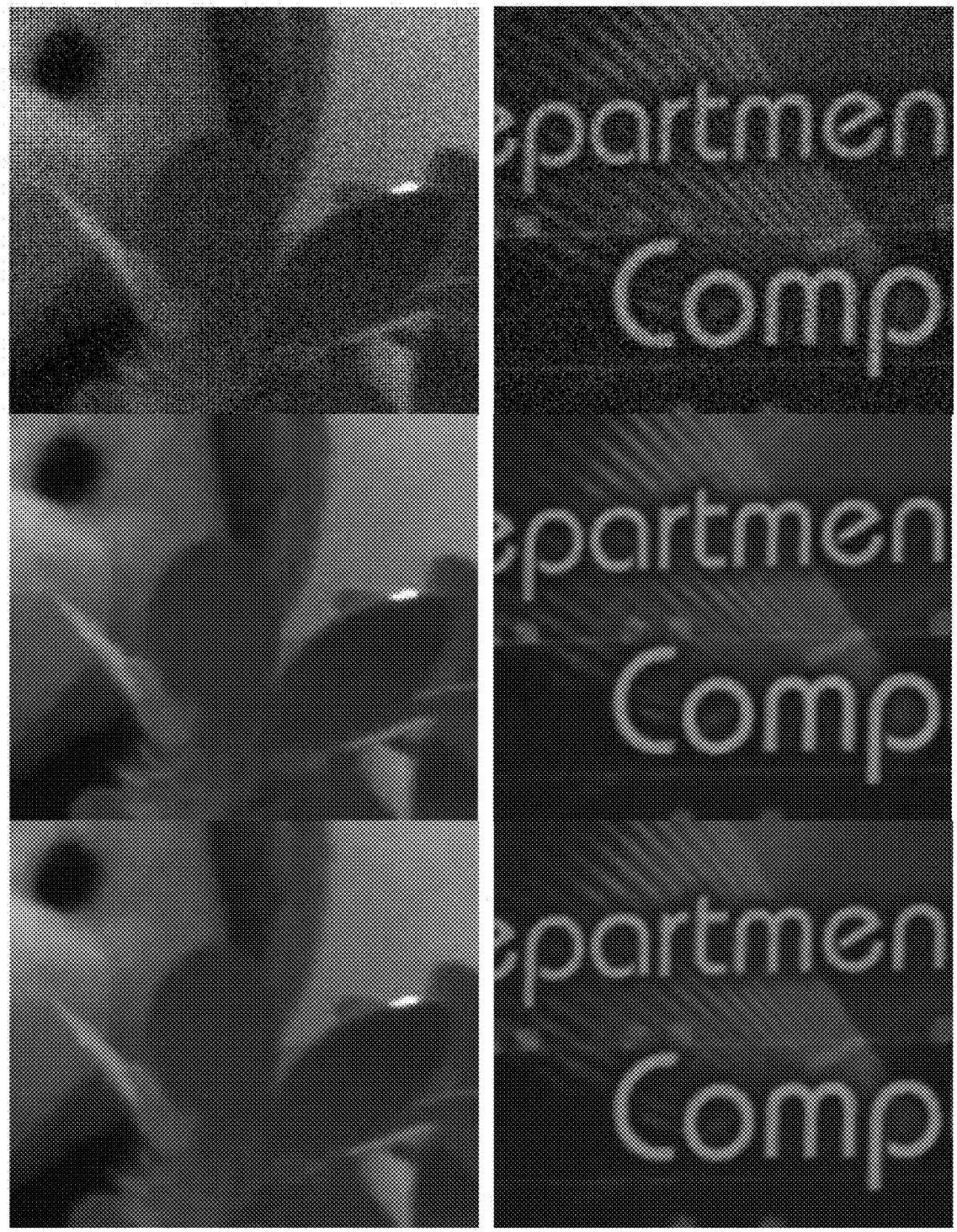
FIG. 7 is a series of screenshots of CFA frames: left column is one frame of a reconstructed Bear sequence from the raw CFA sequence (estimated noise level: $\sigma_r=13$, $\sigma_g=12$, $\sigma_b=26$); right column is one frame of the reconstructed Notebook sequence from the raw CFA sequence (estimated noise level: $\sigma_r=15$, $\sigma_g=12$, $\sigma_b=26$); and from top to bottom: original noisy CFA image, reconstructed full color image by [4]+VBM3D [17] and the present invention.

To save space, only the results by the spatial-temporal denoising and CDM method and the "LMMSE_CDM+VBM3D_Denoising" method are presented in FIG. 7. The spatial-temporal denoising and CDM method achieves better color reproduction by reducing much the noise-caused color artifacts and preserving the image edge details well.

A spatial-temporal color video reproduction method from the noisy color filler array (CFA) sequence is provided. The spatial-temporal denoising and CDM method has three steps: principal component analysis based spatial-temporal CFA denoising; initial spatial color demosaicking (CDM); and spatial-temporal enhancement. The spatial-temporal redundancies existing in the CFA sequence are effectively exploited to reproduce and enhance the color videos. Two simulated and two real noisy CFA sequences were used to evaluate the spatial-temporal denoising and CDM method in comparison with state-of-the-art denoising and CDM schemes, including the benchmark VBM3D algorithm. The experimental results showed that the spatial-temporal denoising and CDM method achieves the best color video reproduction in terms of both PSNR and subjective quality, preserving well the image edge structures and suppressing effectively the color artifacts.

Figure 8:
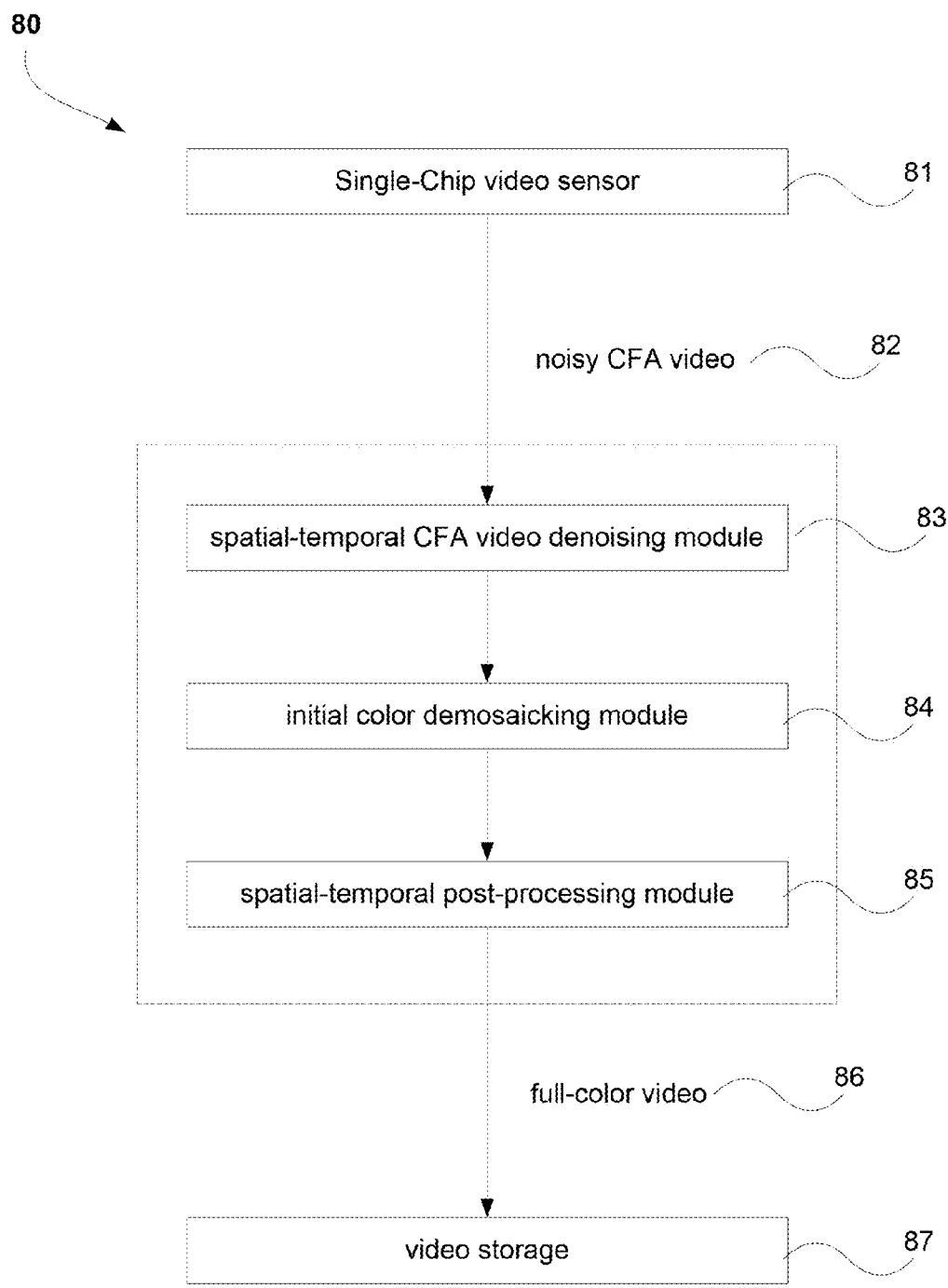
FIG. 8 is a system diagram of a system for spatial-temporal denoising and demosaicking for noisy color filter array (CFA) video.

Referring to FIG. 8, a system 80 for spatial-temporal denoising and demosaicking for noisy color filler array (CFA) video is provided. The system 80 may be embodied as a computer system having three main software modules: a spatial-temporal CFA video denoising module 83, an initial color demosaicking (CDM) module 84 and a spatial-temporal post-processing module 85. The spatial-temporal CFA video denoising module 83 applies spatial-temporal CFA video denoising to the noisy CFA video 82 in order to generate a denoised CFA. The initial color demosaicking (CDM) module 84 applies initial color demosaicking (CDM) to the denoised CFA video in order to generate a demosaicked video. The spatial-temporal post-processing module 85 to apply spatial-temporal post-processing to the demosaicked video in order to reduce CDM artifacts and CDM errors and enhance the quality of the video.

A single-chip video sensor 81 provides the noisy CFA video 82 to the spatial-temporal CFA video denoising module 83. Also, a video storage 87 stores the full color video sequence 86 output by the spatial-temporal post-processing module 85.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

We claim:

1. A method for spatial-temporal denoising and demosaicking for noisy color filter array (CFA) video, the method comprising:
    applying spatial-temporal CFA video denoising to the CFA video in order to generate a denoised CFA using a video processing device;
    applying initial color demosaicking (CDM) to the denoised CFA video in order to generate a demosaicked video using the video processing device; and
    applying spatial-temporal post-processing to the demosaicked video in order to reduce CDM artifacts and CDM errors and enhance the quality of the video using the video processing device;
    wherein spatial-temporal CFA video denoising comprises:
        partitioning each CFA frame in the CFA video to be denoised into a plurality of CFA blocks using the video processing device;
        stretching the CFA blocks to a variable vector, where the variable vector contains a plurality of vector elements and the number of vector elements in the plurality of vector elements is equal to or exceeds the number of CFA blocks in the plurality of CFA blocks using the video processing device;
        removing a noise vector from the variable vector, where the vector elements in the plurality of vector elements comprise a real data component and a noise component, the noise vector comprises the noise component from each vector element in the plurality of vector elements, and removing the noise vector includes removing the noise element from each vector element;
        constructing a spatial-temporal sample dataset using the video processing device; and
        fast block matching to find similar CFA blocks to a reference CFA block in the current and adjacent CFA frames of the CFA video using the video processing device.

2. The method according to claim 1, wherein CDM comprises:
    calculating horizontal and vertical gradients of each pixel of a CFA block using the video processing device;
    performing CDM in a horizontal or vertical direction depending on the calculated gradients using the video processing device;
    fusing filtering outputs at horizontal and vertical directions using the video processing device;
    interpolating missing green color components at red and blue positions using the video processing device;
    interpolating missing blue color components at red positions and missing red color components at blue positions using the video processing device; and
    interpolating missing red and blue color components at green positions using the video processing device.

3. The method according to claim 1, wherein spatial-temporal post-processing comprises:
    measuring similarity between a triplet of a current pixel to be enhanced with a spatial-temporal neighborhood triplet using the video processing device; and
    calculating a weighted average of the most similar pixels to a reference pixel to determine the enhanced pixel of the reference pixel using the video processing device.

4. A system for spatial-temporal denoising and demosaicking for noisy color filter array (CFA) video, the system comprising:
    CFA video data storage configured to store CFA video data;
    module data storage configured to store module data; and
    a processor;
    wherein the module data storage contains a spatial-temporal CFA video denoising module, where the spatial-temporal CFA video denoising module configures the processor to:
        partition each CFA frame in the CFA video to be denoised into a plurality of CFA blocks;
        stretch the CFA blocks to a variable vector, where the variable vector contains a plurality of vector elements and the number of vector elements in the plurality of vector elements is equal to or exceeds the number of CFA blocks in the plurality of CFA blocks;
        remove a noise vector from the variable vector, where the vector elements in the plurality of vector elements comprise a real data component and a noise component, the noise vector comprises the noise component from each vector element in the plurality of vector elements, and removing the noise vector includes removing the noise element from each vector element;
        construct a spatial-temporal sample dataset;
        fast block match to find similar CFA blocks to a reference CFA block in the current and adjacent CFA frames of the CFA video; and
        generate a denoised CFA using the CFA blocks;
    wherein the module data storage contains an initial color demosaicking module, where the CDM module configures the processor to apply initial color demosaicking to the denoised CFA video in order to generate a demosaicked video; and
    wherein the module data storage contains a spatial-temporal post-processing module, where the spatial-temporal post-processing module configures the processor to apply spatial-temporal post-processing to the demosaicked video in order to reduce CDM artifacts and CDM errors and enhance the quality of the video.

5. The system according to claim 4, further comprising video sensor, where the processor is configured to receive the CFA video using the video sensor.

6. The system according to claim 4, further comprising a video storage configured to store full color video sequences; wherein the processor is configured to output full color video sequences using the post-processed demosaicked video.

7. The system according to claim 4, wherein the spatial-temporal CFA video denoising module, the initial color demosaicking module and the spatial-temporal post-processing module are hardware modules.

* * * * *

UNITED STATES PATENT AND TRADEMARK OFFICE
CERTIFICATE OF CORRECTION

PATENT NO. : 8,345,971 B2  
APPLICATION NO. : 12/825126  
DATED : January 1, 2013  
INVENTOR(S) : Lei Zhang et al.

Page 1 of 1

It is certified that error appears in the above-identified patent and that said Letters Patent is hereby corrected as shown below:

Col. 12, Claim 5, line 53, after "comprising" add --a--.

Signed and Sealed this
Twenty-sixth Day of February, 2013

Teresa Stanek Rea
*Acting Director of the United States Patent and Trademark Office*